United States Patent [19]

Sakakibara et al.

[11] 4,446,889
[45] May 8, 1984

[54] PRESSURE MODULATING VALVE ASSEMBLY

[75] Inventors: Naoji Sakakibara; Hiroyuki Amano, both of Chiryu; Hiroaki Morioka, Toyota, all of Japan

[73] Assignee: Aisin Seiki Kabushiki Kaisha, Kariya, Japan

[21] Appl. No.: 404,738

[22] Filed: Aug. 3, 1982

[30] Foreign Application Priority Data

Aug. 7, 1981 [JP] Japan .................................. 56-123130

[51] Int. Cl.³ .................... F15B 13/044; F16K 11/00; F16K 11/02
[52] U.S. Cl. ................. 137/625.4; 251/138; 335/270; 335/274
[58] Field of Search ............................ 251/138, 141; 137/625.4, 625.65; 335/135, 2, 270, 274, 275, 276

[56] References Cited

U.S. PATENT DOCUMENTS

| 379,064 | 3/1888 | Hamilton | 335/276 |
| 1,714,336 | 5/1929 | Yaxley | 335/276 |
| 3,982,562 | 9/1976 | Pickett | 251/138 X |
| 4,170,339 | 10/1979 | Ueda et al. | 251/138 |
| 4,242,004 | 12/1980 | Adler | 335/276 X |
| 4,249,457 | 2/1981 | Sakakibara | 137/625.65 X |
| 4,250,924 | 2/1981 | Sakakibara | 251/138 X |

Primary Examiner—Martin P. Schwadron
Assistant Examiner—John S. Starsiak, Jr.
Attorney, Agent, or Firm—Sughrue, Mion, Zinn, Macpeak and Seas

[57] ABSTRACT

The pressure modulating valve assembly includes a solenoid coil, a yoke having curved support surfaces extending from one end of the coil to the other, and a resilient non-magnetic valve support having at least one valve secured thereto and a pair of attaching legs secured to the yoke in overlying relation relative to the curved support surfaces. An armature of magnetic material is secured to the valve support at a central portion thereof spaced from the point of attachment of the valve support to the yoke. A spring normally biases the armature in a direction away from the solenoid coil so that upon energization of the coil the solenoid support and the armature secured thereto are subjected to a rolling motion along the curved surfaces of the yoke to provide a friction free connection between the yoke and the combined armature and valve support.

5 Claims, 4 Drawing Figures

PRESSURE MODULATING VALVE ASSEMBLY

BACKGROUND OF THE INVENTION

The present invention is directed to a pressure modulating valve assembly and more particularly to an electrically operated valve supporting member which is mounted in rolling contact with a yoke of a solenoid coil in response to the operation of the solenoid coil to modulate pressure in a valve chamber.

A conventional pressure modulating valve is disclosed in U.S. Pat. No. 4,249,457 granted Feb. 10, 1981 and entitled "Vacuum Servo Motor". In the conventional pressure modulating valve assembly, an armature of magnetic material having recesses at opposite sides thereof is pivoted on a yoke member by means of upstanding projections formed at opposite sides of the yoke whereby the projections are loosely fitted within the recesses, respectively. A valve supporting member of non-magnetic material is secured to the armature and is provided with valve members at opposite ends thereof. Spring means are provided for biasing the armature to a first position wherein one of the valve members engages a valve seat and a solenoid coil is provided for biasing the armature to a second position against the force of the spring means to move the other valve member into engagement with a valve seat while moving the first mentioned valve member out of engagement with its respective valve seat. In the foregoing arrangement, the durability of the valve is lessened since the recesses of the armature and the projections on the yoke are quickly worn by the constant rubbing action which occurs on every rotation of the armature. Such wear eventually leads to undesirable tolerances which adversely affect the seating of the valve members on their respective seats.

SUMMARY OF THE INVENTION

The present invention provides a new and improved pressure modulating valve assembly which obviates the above-mentioned disadvantages associated with the conventional pressure modulating valve assembly.

The present invention provides a new and improved pressure modulating valve assembly which is low in cost, simple in construction and durable in operation.

The present invention provides a new and improved pressure modulating valve assembly comprising a solenoid coil, yoke means having curved support surfaces extending from one end of said coil to the other, resilient nonmagnetic valve supporting means having at least one valve secured thereto and attaching leg means secured to said yoke means in overlying relation relative to said curved supporting surfaces, an armature of magnetic material secured to said valve supporting means at a central portion thereof spaced from the point of attachment of said valve supporting means to said yoke means and spring means normally biasing said armature in a direction away from said solenoid coil whereby upon energization of said coil said solenoid supporting means and said armature secured thereto are subjected to a rolling motion along the curved surface of said yoke means to provide a friction-free connection between said yoke means and said combined armature and valve support means.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
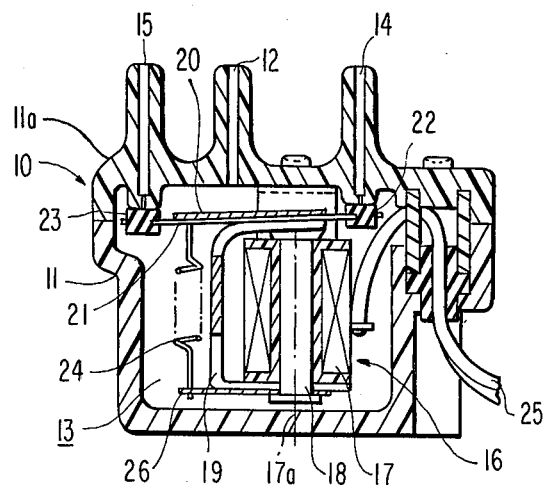
FIG. 1 is a cross-sectional view through a pressure modulating valve assembly according to the present invention showing a first embodiment of a valve supporting and operating arrangement.

The pressure modulating valve assembly 10 as shown in the embodiment of FIG. 1, is provided with a casing 11 and a cover 11a having a pair of inlet ports 14, 15 and an outlet port 12. The cover 11a is adapted to be hermetically engaged with the casing 11 to define a valve chamber 13 therein. An electromagnet assembly 16 comprised of a core 18 and a solenoid coil 17 is carried by a yoke 19 which in turn is secured to the cover 11a. The top portion of the yoke 19 is provided with a pair of curved arms 19a, 19a having free end portions 19b, 19b extending over the solenoid coil 17 on opposite sides of the central axis 17a. The lower end of the core 18 is secured to the bottom portion of the yoke 19 and the lead wires 25 connected to the coil 17 are hermetically sealed where they pass through an opening in the casing 11. An elongated flexible, resilient valve supporting member 21 of non-magnetic material is adapted to be secured to the curved arms 19a, 19a as best seen in the exploded view of FIG. 2. A pair of valve members 22 and 23 are secured to opposite ends of the valve supporting member at positions corresponding to the positions of the inlet ports 14 and 15, respectively. The valve supporting member 21 is provided with a pair of elongated legs 21a, 21a which extend parallel to the main body 21c of the valve supporting member on opposite sides thereof. The leg portions 21a, 21a are spaced from the body portion 21c by slots 21b, 21b. The leg portions 21a, 21a are provided with free end portions 21e, 21e and are of integral onepiece construction with a transverse connecting portion 21d at the opposite ends thereof. An opening 21f is provided intermediate the valve member 23 and the transversely extending connecting portion 21d to provide a passage for a spring 24, the arrangement and purpose of which will be described hereinafter.

A substantially rectangular armature 20 of magnetic material is secured to the valve supporting member by means of pins or rivets (not shown) extending through a pair of holes 21g, 21g located in the leg portions 21a, 21a adjacent the transversely extending connecting portion 21d and a pair of holes 20b, 20b formed in the armature 20. The valve supporting member 21 is in turn secured to the yoke 19 by pins or rivets (not shown) which extend through a pair of holes 21h, 21h formed in the free ends 21e, 21e of the leg portions 21a 21a and a pair of holes 19d, 19d located adjacent the free ends 19b, 19b of the curved arms 19a, 19a of the yoke 19. An additional pair of holes 19e, 19e are provided in the curved portions of the arms 19a, 19a for receiving the ends of the pins or rivets which secure the armature to the valve supporting member. With the armature 20, the valve supporting member 21 and the yoke 19 secured in the foregoing manner, the armature 20 is positioned in overlying relation relative to the curved arms of the yoke 19 with the portion of the armature 20 closest to the valve member 22 being disposed in overlying relation relative to the core 18 of the electromagnet 16. A projection 20a extends outwardly from the opposite side of the armature 20 and one end of the spring 24 is secured to the projection 20a. The opposite end of the spring 24 is secured to a retainer plate 26 which is secured between the core 18 and the yoke 19 of the electromagnet assembly 16. The biasing force of the spring 24 urges the projection 20a of the armature 20 downwardly thereby maintaining the desired gap between the body 21c of the valve supporting member 21 and the core 18 when the solenoid coil 17 is in the deenergized condition. In this position, the valve member 22 is disposed in engagement with the valve seat surrounding the inlet port 14 and the valve member 23 is in spaced relation to the valve seat surrounding the inlet port 15. The central axis 17a of the electromagnet assembly 16 is positioned between the arms 19a, 19a of the yoke 19 whereby upon energization of the solenoid coil the armature 20 will be moved toward the electromagnet 16 against the biasing force of the spring 24. As the armature 20 and the valve support plate 21 which are secured together are drawn toward the electromagnet 16 the valve supporting plate pivots about a line extending transversely across the arms 19a, 19a, which line moves progressively along the curved surface of the arms. Thus, the valve supporting plate 21 and the armature 20 effectively rock on the curved arms with a rolling motion which is substantially friction free thereby eliminating any possible wear between the arms of the yoke 19 and the valve supporting plate 21. The pivotal or rolling motion of the armature 20 continues until such time as the valve member 23 engages the seat surrounding the inlet port 15 and the valve member 22 is disengaged from the seat surrounding the inlet port 14.

When the solenoid coil 17 is deenergized the valve supporting plate 21 and the armature 20 pivot in a rolling fashion about the curved arms of the yoke 19 under the influence of the spring 24 to return the valve members to the original condition. In the valve assembly according to the present invention the inlet port 14 may be in communication with a vacuum source such as the intake manifold of an automobile and the inlet port 15 may be in communication with the atmosphere. The valve members 22 and 23 are alternately moved into seating engagement with the valve seats surrounding the inlet ports 14 and 15 in accordance with the energization and deenergization of the solenoid coil which receives an electrical input signal such as a pulse frequency signal from a suitable source. Thus, the pressure in the valve chamber is modulated in accordance with the operation of the valve members 22 and 23. The modulated pressure in the valve chamber 13 is applied to a suitable actuator (not shown) through the outlet port 12.

Figure 2:
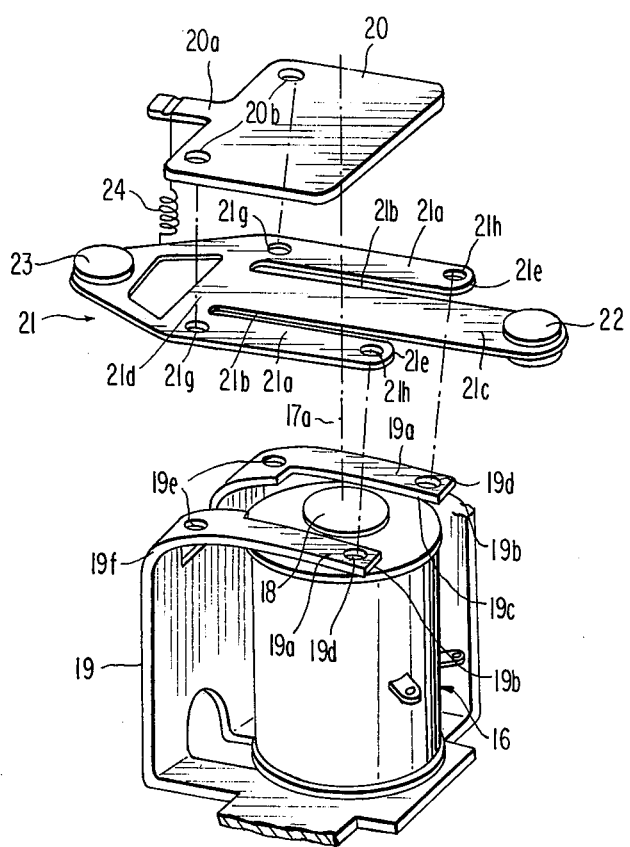
FIG. 2 is an exploded perspective view showing the principal parts of the invention according to the first embodiment of FIG. 1.
Figure 3:
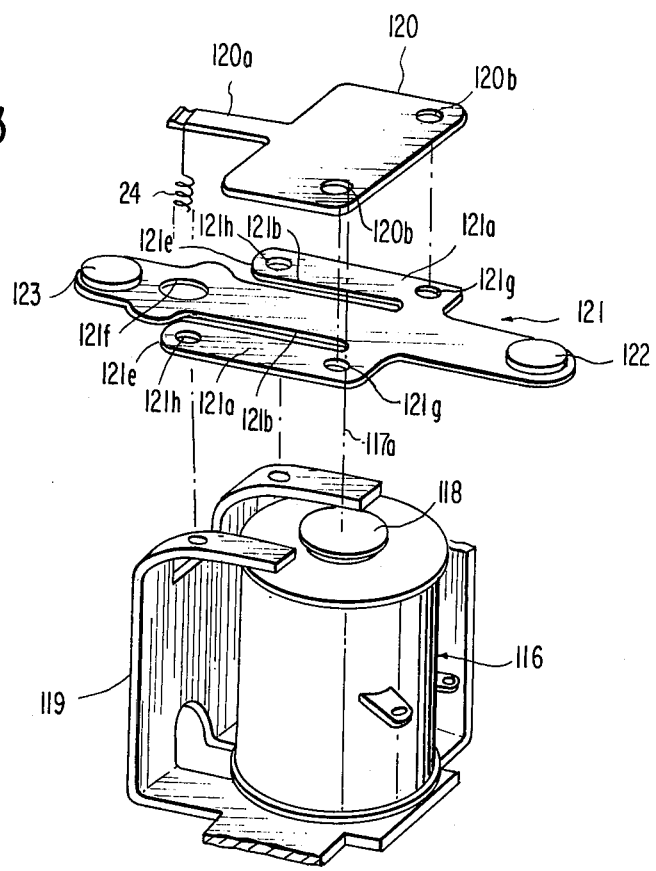
FIG. 3 is an exploded perspective view similar to FIG. 2 showing a second embodiment of the present invention.

According to a second embodiment of the present invention as shown in FIG. 3, the valve supporting member 121 is so constructed that the transversely extending connecting portion 121d thereof is arranged closer to the valve member 122 which is substantially opposite to the arrangement shown in the embodiment of FIGS. 1 and 2. The armature 120 is connected to the transversely extending connection portion 121d by suitable rivets or the like (not shown) in a manner similar to that disclosed in the previous embodiment. The various other components of the valve assembly according to the embodiment of FIG. 3 which are identified by reference numerals in the 100 series correspond to similar elements in the embodiment of FIG. 2 with corresponding lower order reference numerals. The operation of the assembly according to the embodiment of FIG. 3 is substantially identical to that described above with respect to the embodiment of FIG. 2.

Figure 4:
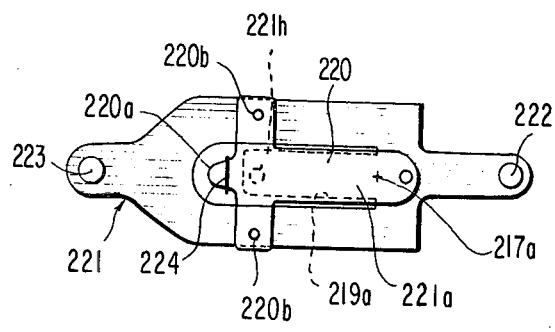
FIG. 4 is a plan view showing a valve supporting plate and armature assembly according to a third embodiment of the present invention.

In the third embodiment of the present invention as shown in FIG. 4, the valve supporting member 221 is provided with valve members 222 and 223 at opposite ends thereof and an elongated central recess in which a single leg portion 221a extends along the axis between the two valve members. The free end of the leg portion 221a is provided with an aperture 221h through which a rivet (not shown) or the like extends for securing the free end of the leg portion 221a to the yoke having a single arm 219a adapted to overlie the core of an electromagnet whose axis would be located at the point 217a. An armature 220 is secured to the valve supporting member 221 by means of rivets 220b, 220b or the like and is provided with a projection 220a to which one end of the spring 224 is secured. The operation of the valve members on the valve supporting member is substantially identical to that described with respect to the previous embodiments In summary, the pressure modulating valve assembly 10 is not subjected to any frictional rubbing action between moving members since the armature is connected to the valve supporting member and the yoke in a manner whereby a friction-free rolling action is obtained. The pressure modulating valve assembly according to the present invention is capable of modulating not only vacuum pressure but also positive pressure. Liquid pressure may also be modulated by a valve assembly according to the present invention.

While the invention has been particularly shown and described with respect to preferred embodiments thereof, it will be understood by those in the art that the foregoing and other changes in form and details may be made therein without departing from the spirit and scope of the invention.

What is claimed is:

1. A pressure modulating valve assembly comprising housing means having at least one inlet port and one outlet port, solenoid coil means mounted in said housing means, magnetic yoke means associated with said coil means and having curved arm means extending over one end of said coil means, a resilient non-magnetic valve supporting member having leg means secured to said yoke means in overlying relation to said curved arm means and said solenoid coil means, armature means secured to said valve supporting means at a location spaced from the securement of said valve supporting member to said yoke means with said armature overlying said solenoid coil means, spring means connected to said armature means for normally biasing said armature means and valve supporting member about said curved surface of said yoke means away from said solenoid coil means and at least one valve member on said valve supporting member adapted to be moved into and out of engagement with valve seat means surrounding said inlet port.

2. A pressure modulating valve assembly as set forth in claim 1, further comprising a second valve member carried by said valve supporting member, said valve members being located at opposite ends of said valve supporting member on opposite sides of said armature means.

3. A pressure modulating valve assembly as set forth in claim 1, wherein said magnetic yoke means has a substantially C-shaped configuration with one end thereof secured to one end of said solenoid coil and the opposite end thereof being in the form of a pair of parallel curved arms extending over the opposite end of said solenoid coil means and wherein said valve supporting member is comprised of a flat resilient non-magnetic elongated body having a transversely extending cross piece adjacent one end thereof with a pair of flat, resilient elongated legs extending therefrom toward the other end of said body in parallel spaced relation thereto on opposite sides thereof, the free ends of said legs being secured to the ends of said curved arms of said yoke means.

4. A pressure modulating valve assembly as set forth in claim 3, wherein said armature is secured to the opposite surfaces of said legs adjacent said cross piece with the armature overlying said body and said legs of said valve support member.

5. A pressure modulating valve assembly as set forth in claim 1, wherein said yoke means is comprised of a C-shaped member secured at one end thereof to one end of said solenoid coil means and with the opposite end comprising a single curved leg extending over the opposite end of said solenoid coil means and wherein said valve supporting member is comprised of an elongated body member having an elongated opening in the central portion thereof with a single leg integral with said body extending in said opening substantially the entire length thereof, said leg being secured at its free end to said curved arm of said yoke means and said armature being secured to the opposite surface of said valve supporting member in overlying relation to said opening.

* * * * *